United States Patent
Horobin

(10) Patent No.: US 12,385,428 B2
(45) Date of Patent: Aug. 12, 2025

(54) THRUST CONTROL METHOD FOR AN AIRBREATHING JET ENGINE

(71) Applicant: ROLLS-ROYCE plc, London (GB)

(72) Inventor: Marcus S Horobin, Bristol (GB)

(73) Assignee: ROLLS-ROYCE plc, London (GB)

( * ) Notice: Subject to any disclaimer, the term of this patent is extended or adjusted under 35 U.S.C. 154(b) by 77 days.

(21) Appl. No.: 18/422,935

(22) Filed: Jan. 25, 2024

(65) Prior Publication Data
US 2024/0280046 A1   Aug. 22, 2024

(30) Foreign Application Priority Data
Feb. 21, 2023   (GB) ..................................... 2302422

(51) Int. Cl.
*F02B 3/06*    (2006.01)
*F02B 23/06*   (2006.01)

(52) U.S. Cl.
CPC ............ *F02B 3/06* (2013.01); *F02B 23/0645* (2013.01); *F02B 2275/14* (2013.01)

(58) Field of Classification Search
CPC .... F02B 3/06; F02B 23/0645; F02B 2275/14; F05D 2220/10; F05D 2270/051; F05D 2270/301; F05D 2270/3015; F05D 2270/708; F02K 3/10; F02C 9/28
USPC ....................................................... 123/294
See application file for complete search history.

(56) References Cited

U.S. PATENT DOCUMENTS

| | | |
|---|---|---|
| 3,472,027 A | 10/1969 | Snow et al. |
| 4,128,995 A | 12/1978 | Toot |
| 2012/0102968 A1 | 5/2012 | Fuchs |
| 2016/0215703 A1 | 7/2016 | Childers et al. |
| 2019/0264701 A1* | 8/2019 | Rowe ...................... F04D 27/02 |
| 2021/0262398 A1* | 8/2021 | Gemin .................... F02C 7/268 |

OTHER PUBLICATIONS

Jun. 25, 2024 Extended Search Report issued in European Patent Application No. 24153047.6.
Aug. 14, 2023 Search and Examination Report issued in British Patent Application No. GB2302422.7.

* cited by examiner

Primary Examiner — Yi-Kai Wang
(74) Attorney, Agent, or Firm — Oliff PLC

(57) ABSTRACT

A method of thrust control for an airbreathing jet engine includes obtaining a demanded thrust setting, a value of static pressure at a first axial location of a combustion chamber of the airbreathing jet engine and a value of static pressure at a second axial location of the combustion chamber of the airbreathing jet engine. The second axial location is downstream of the first axial location. The method also includes obtaining a ratio of the value of static pressure at the first axial location of the combustion chamber to the value of static pressure at the second axial location of the combustion chamber; and controlling a fuel flow rate of the airbreathing engine based at least in part on the demanded thrust setting and the ratio of the value of the static pressure at the first axial location to the value of the static pressure at the second axial location.

19 Claims, 6 Drawing Sheets

THRUST CONTROL METHOD FOR AN AIRBREATHING JET ENGINE

CROSS-REFERENCE TO RELATED APPLICATIONS

This specification is based upon and claims the benefit of priority from United Kingdom patent application number GB 2302422.7 filed on Feb. 21, 2023, the entire contents of which is incorporated herein by reference.

BACKGROUND

1. Field of the Disclosure

The present disclosure concerns a thrust control method for an airbreathing jet engine.

More particularly, the present disclosure concerns a thrust control method for a reheat system based at least in part on pressure measurement at multiple axial locations within the combustion chamber of the reheat system.

The present disclosure also concerns modifications to an airbreathing jet engine to enable to the performance of the method for thrust control.

2. Description of the Related Art

Airbreathing jet engines such as reheat systems are a known means of augmenting the thrust produced by a gas turbine engine for aircraft propulsion.

Other forms of airbreathing jet engine include ramjets.

Although mostly used for military applications, reheat systems have also been used for civil applications, such as the Aérospatiale/British Aircraft Corporation Concorde.

The degree of thrust augmentation produced by a reheat system is typically controlled by closed-loop feedback control of the position or orientation of a component of a reheat system fuel metering valve, such as a flow-metering orifice.

However, as this form of control does not account for differences between the demanded and delivered fuel flow, or the combustion efficiency of the delivered fuel within the reheat duct, this form of control may be less accurate than required, producing more thrust than required and unnecessarily increasing fuel consumption.

There therefore exists a desire to provide a method that overcome these problems or at least provides a useful alternative to known thrust control methods.

SUMMARY OF THE DISCLOSURE

According to a first aspect there is provided a method of thrust control for an airbreathing jet engine that has a combustion chamber. The method comprises obtaining a demanded thrust setting, obtaining a value of static pressure at a first axial location of the combustion chamber of the airbreathing jet engine and obtaining a value of static pressure at a second axial location of the combustion chamber of the airbreathing jet engine. The second axial location is downstream of the first axial location. The method also comprises obtaining a ratio of the value of static pressure at the first axial location of the combustion chamber to the value of static pressure at the second axial location of the combustion chamber and controlling a fuel flow rate of the airbreathing engine based at least in part on the demanded thrust setting and the ratio of the value of the static pressure at the first axial location to the value of the static pressure at the second axial location.

An advantage of the above method is that a more accurate method of control is obtained, relative to thrust control based on demanding a fuel flow to be delivered. This is because differences in static pressure at different locations within the combustion chamber equate to a change in momentum of a working fluid within the combustion chamber, and consequently, the thrust developed by the airbreathing engine. This method also accommodates for potential variables that may influence a fuel flow demand based thrust control method, such as the density of the fuel combusted within the combustion chamber and the combustion efficiency of the fuel when burnt within the combustion chamber.

Optionally, the first axial location is upstream of a fuel injection apparatus within the combustion chamber, and the second axial location is downstream of the fuel injection apparatus of the combustion chamber.

The value of static pressure at the first axial location may be obtained by measuring a static pressure at at least one static pressure offtake in a wall of the combustion chamber at the first axial location.

The value of static pressure at the second axial location may be obtained by measuring a static pressure at at least one static pressure offtake in a wall of the combustion chamber at the second axial location.

The value of static pressure at the first axial location may be an average of the static pressure measured at the at least one static pressure offtake at the first axial location.

The value of static pressure at the second axial location may be an average of the static pressure measured at the at least one static pressure offtake at the second axial location.

An advantage of using averages static pressures is that the stability of the thrust control method may be improved.

The average of static pressure measured at the first axial location may be a fluidic average, or a numerical average.

The average of static pressure measured at the second axial location may be a fluidic average, or a numerical average.

Fluidic averaging, by coupling a plurality of pressure offtakes at the same axial location together (e.g., a plurality of offtakes circumferentially disposed around a cross-section of the combustion chamber at a fixed axial location), provides a simple averaging means.

Numerical averaging may be performed within a controller and may be combined with other numerical processing functions such as filtering. This may increase the stability of an input to the control method, and consequently, the stability of the control method.

Controlling fuel flow rate may be based at least in part on the demanded thrust setting and a ratio of the value of the static pressure at the first axial location to the value of the static pressure at the second axial location. Controlling fuel flow rate may comprise referencing a look-up table or equation having the demanded thrust setting as an input to determine a demanded ratio of the value of the static pressure at the first axial location to the value of the static pressure at the second axial location from an output of the look-up table, and varying a fuel flow rate to the airbreathing jet engine such that the ratio of the value of the static pressure at the first axial location of the combustion chamber to the value of static pressure at the second axial location of the combustion chamber is substantially equal to the demanded ratio of the value of the static pressure at the first axial location to the value of the static pressure at the second axial location.

Controlling to a pressure ratio has the advantage that the control system method broadly takes account of the flight condition of an aircraft in which the airbreathing engine is comprised and generating thrust.

The demanded ratio of the value of the static pressure at the first axial location to the value of the static pressure at the second axial location may be additionally based upon a flight condition of an aircraft comprising the airbreathing jet engine.

This may be advantageous if the aircraft is operating at or close to a boundary of its operational envelope (forward speed, altitude). This is because when the aircraft is operating at or close to a boundary of its operational envelope, the propulsion system of the aircraft may be subject to additional constraints (for example, a rotational speed limit or maximum pressure limit of a related gas turbine engine), making it desirable to modify the static pressure-ratio based control. Alternatively or additionally, a customer of the aircraft comprising the air breathing engine may have specific thrust requirements for portions of the operational envelope, corresponding to the aircraft flight condition.

The flight condition of the airbreathing engine may comprise at least one of a velocity of the airbreathing jet engine, a static temperature of an atmosphere through which the airbreathing jet engine is travelling, a static pressure of the atmosphere through which the airbreathing jet engine is travelling.

The demanded ratio of the value of the static pressure at the first axial location to the value of the static pressure at the second axial location may be additionally based upon a demanded discharge angle of a jet through a thrust-vectoring propelling nozzle and/or a demanded cross-sectional area of a variable area propelling nozzle.

This is advantageous because the method may additionally compensate for changes in a configuration of the airbreathing engine which may cause a change in static pressure drop between different axial locations of the combustion chamber and/or a change in the static pressure distribution at the first axial location and/or second axial location. For example, actuating a thrust-vectoring nozzle to change the discharge angle may change the static pressure distribution at the second axial location in particular, due to its proximity to the thrust vectoring nozzle.

Controlling the fuel flow rate of the airbreathing jet engine may additionally comprise varying a configuration of a fuel distribution valve to vary the distribution of fuel to different portions of the fuel injection apparatus such that the fuel flow rate provided to the airbreathing jet engine is minimised for the demanded thrust setting.

This has the advantage that the thrust control method may also reduce specific fuel consumption of the airbreathing engine, by enabling optimisation of fuel distribution within the combustion chamber.

According to a second aspect, there is provided an airbreathing jet engine. The airbreathing engine comprises a combustion chamber and at least one fuel injection apparatus configured to inject fuel into the combustion chamber. The airbreathing jet engine additionally comprises at least one static pressure offtake at a first axial location within the combustion chamber and at least one static pressure offtake at a second axial location within the combustion chamber. The airbreathing jet engine also comprises at least one pressure transducer, the at least one pressure transducer configured to obtain a value of static pressure at the first axial location, and to obtain a value of static pressure at the second axial location. The airbreathing jet engine also comprises a fuel metering valve and a fuel flow controller. The fuel flow controller controls a flow rate of fuel provided by the fuel metering valve to the combustion chamber via the at least one fuel injection apparatus based at least in part on a demanded thrust setting for the airbreathing jet engine and a ratio of a value of the static pressure at the first axial location to a value of the static pressure at the second axial location.

The fuel flow controller may additionally control the flow rate of fuel, based upon a flight condition of an aircraft comprising the airbreathing jet engine and/or a configuration of the airbreathing jet engine.

The airbreathing jet engine may be a reheat system (also known as an afterburner) or a ramjet.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

The term "airbreathing jet engine" as used herein is a jet engine that generates thrust by ejecting a propelling jet of exhaust through a nozzle. For example, an airbreathing jet engine may be a gas turbine engine, a ramjet, or a reheat system.

The term "reheat system" as used herein means a combustion chamber and propelling nozzle, placed downstream of a gas turbine, Fuel is burnt within the combustion chamber of the reheat system to augment the thrust produced by an upstream gas turbine engine. A reheat system is also known as an afterburner.

Reheat systems and ramjets are forms of athodyd as they are aero thermodynamic dynamic ducts. An athodyd is here defined as a form of jet engine comprising a continuous duct or tube of constant or varying cross-sectional area, into which air is admitted at an upstream entrance, fuel is added and combusted within the engine, and the resulting exhaust gas discharged at a downstream exit.

The term "% augmented thrust" as used herein is defined as the % increase in thrust due to operation of a reheat system relative to the dry thrust produced by a gas turbine engine. Thus, at for example 30% augmented thrust, the total thrust developed by the combination of the reheat system and engine is 130% of the dry thrust developed by the engine in isolation.

The term "fuel:air ratio" as used herein is defined as a gravimetric (mass) ratio of fuel to air.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

BRIEF DESCRIPTION OF THE DRAWINGS

Embodiments will now be described by way of example only, with reference to the drawings, in which.

Figure 1:
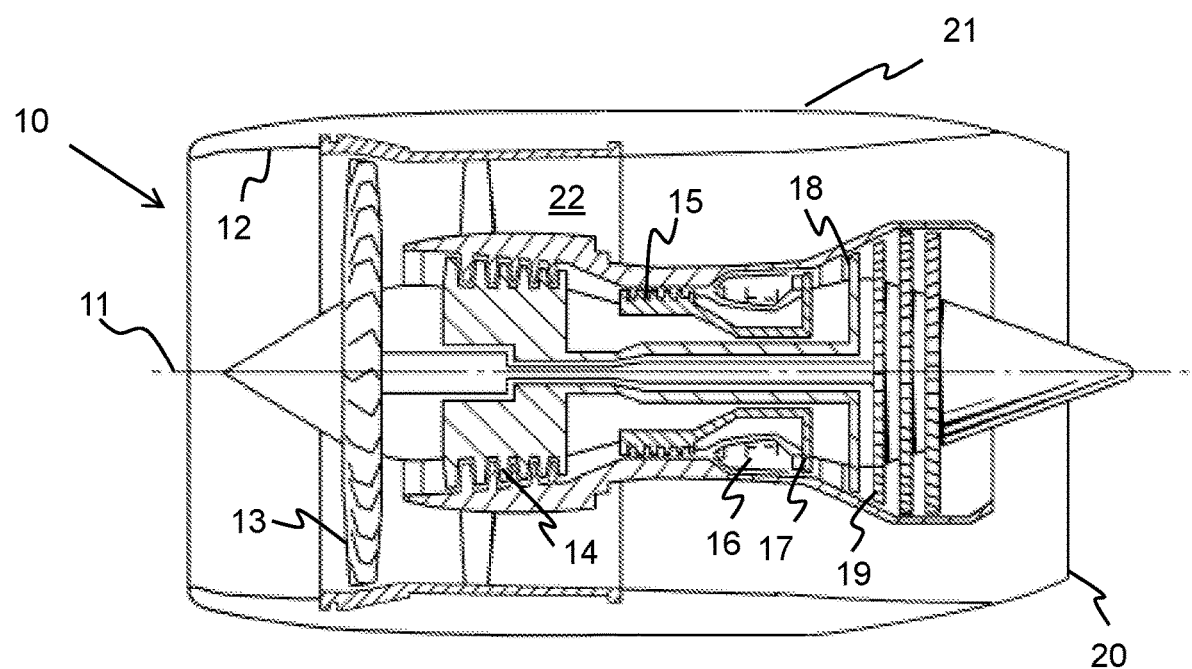
FIG. 1 is a sectional side view of a gas turbine engine.

The following table lists the reference numerals used in the drawings with the features to which they refer:

| Ref no. | Feature | FIG. |
|---|---|---|
| 10 | Gas turbine engine | 1 |
| 11 | Principal and rotational axis (of engine) | 1 4 |
| 12 | Air intake | 1 |
| 14 | Intermediate pressure compressor | 1 |
| 15 | High pressure compressor | 1 |
| 16 | Combustion equipment | 1 |
| 17 | High pressure turbine | 1 |
| 18 | Intermediate pressure turbine | 1 |
| 19 | Low pressure turbine | 1 |
| 20 | Exhaust nozzle | 1 |
| 21 | Nacelle | 1 |
| 22 | Bypass duct | 1 |
| 30 | Combustion chamber | 2 4 |
| 31 | Fuel injection apparatus | 2 4 |
| 32 | Fuel metering valve | 2 4 |
| 33 | Ignitor | 2 4 |
| 34 | Flame stabiliser | 2 4 |
| 35 | First axial location | 4 |
| 36 | Second axial location | 4 |
| 37 | Pressure transducer | 4 |
| 38 | Static pressure offtake | 4 |
| 39 | Tubing | 4 |
| 40 | Propelling nozzle | 2 4 |
| 50 | Reheat system/Airbreathing jet engine | 2 4 |
| 60 | Thrust to fuel:air ratio relationship | 3 |
| 61 | Lean extinction limit | 3 |
| 62 | Rich extinction limit | 3 |
| 63 | Fuel:air ratio upper permissible operational limit | 3 |
| 63a | Fuel:air ratio at maximum thrust | 3 5 |
| 64 | Upper nominal fuel:air ratio limit | 3 |
| 65 | Offset | 3 |
| 70 | Pressure ratio to thrust relationship | 5 |
| 71 | Direction of increasing fuel:air ratio | 5 |
| 80 | Fuel flow controller | 4 |

DETAILED DESCRIPTION OF THE DISCLOSURE

Aspects and embodiments of the present disclosure will now be discussed with reference to the accompanying drawings. Further aspects and embodiments will be apparent to those skilled in the art.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The thrust from the gas turbine engine 10 may be augmented by connecting a reheat system, as an example of air airbreathing jet engine, to the gas turbine engine 10, downstream of the gas turbine engine 10. Thus, gas which has passed through the core, and optionally, the bypass duct of the gas turbine engine, subsequently passes through the reheat system 50.

The following disclosure relates to a method of thrust control of a reheat system 50, as a form of airbreathing jet engine. The disclosure is also applicable to the control of other forms of airbreathing jet engine, such as a ramjet or scramjet.

Figure 2:
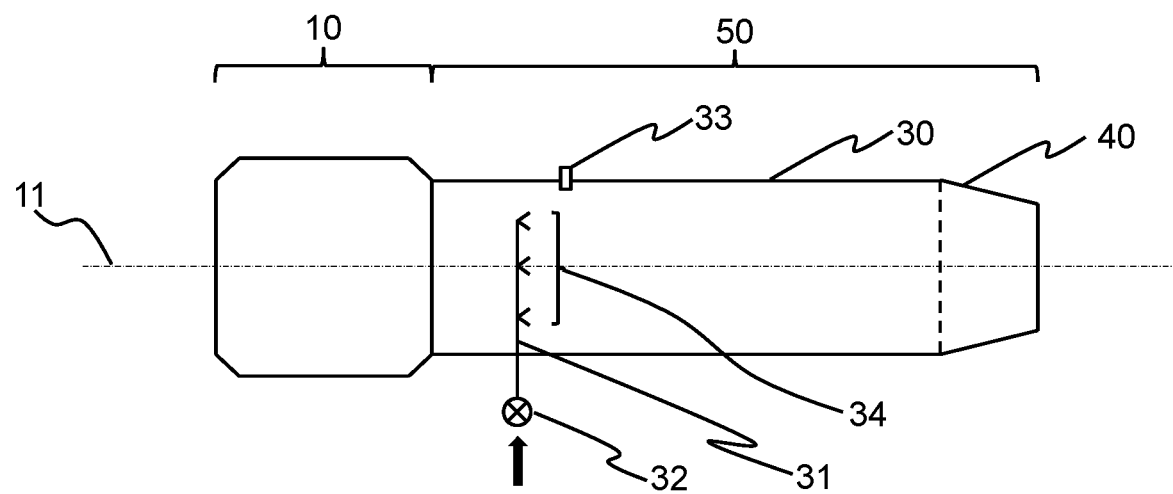
FIG. 2 is a sectional side view of a known reheat system.

As illustrated in FIG. 2, a known reheat system 50 is substantially tubular, comprising a duct (jet pipe) 30 that is connected to a propelling nozzle 40. The duct 30 is a combustion chamber, as fuel may be combusted within it, A principal axis of duct 30 may be co-axial or substantially co-axial with principal axis 11 of gas turbine engine 10.

The propelling nozzle 40 may be a variable area propelling nozzle 40. The propelling nozzle 40 may be a thrust-vectoring propelling nozzle 40, configured to control the angle at which a propelling jet is discharged from the propelling nozzle 40 relative to principal axis 11.

The reheat system 50 comprises at least one fuel injection apparatus 31, that is axially located between an upstream interface with the gas turbine engine 10, and a downstream interface with the propelling nozzle 40. Fuel is provided to the at least one fuel injection apparatus 31 by a reheat system fuel metering valve 32.

In some but not necessarily all embodiments, the fuel injection apparatus 31 may comprise at least one fuel distribution valve (not shown). The at least one fuel distribution valve may distribute fuel to different portions of the fuel injection apparatus 31 and/or, may vary the proportion of fuel that is provided to different portions of the fuel injection apparatus 31. By so doing, fuel may be distributed to different portions of the combustion chamber 30, within which the fuel injection apparatus is present.

In other embodiments, the reheat system 50 may comprise a plurality of independent fuel injection apparatus, each fuel injection apparatus providing fuel to a different portion of the combustion chamber 30. In these embodiments, fuel may be distributed to different portions of the combustion chamber 30 by independently controlling the fuel provided to each independent fuel injection apparatus.

At least one ignitor 33 is located proximal to the at least one fuel injection apparatus 31. The at least one ignitor 33 is configured to ignite fuel injected via the at least one fuel injection apparatus 31 into the jet pipe 30 of the reheat system 50.

At least one flame stabiliser 34, such as a v-gutter, may be located within the combustion chamber, as is known in the art.

The operation and thrust control of the reheat system 50 is now disclosed.

It is known that a reheat system 50 augments the thrust produced by the gas turbine engine 10, by burning fuel within the duct (jet pipe) 30. The duct (jet pipe) 30 is therefore a combustion chamber 30.

Burning fuel in the jet pipe increases the temperature and reduces the density of the working fluid within the jet pipe. This reduction in density increases the velocity of the working fluid within the jet pipe, thereby increasing the momentum of the working fluid when discharged from the propelling nozzle 40. This increase in momentum of the working fluid augments the thrust produced by the gas turbine engine 10.

The effective area of propelling nozzle 40 may be varied in response to combustion within the combustion chamber 30, so as not to adversely impact operation of gas turbine engine 10.

Thus, by controlling the rate at which fuel is injected into the jet pipe 30, it is possible to control the degree of temperature rise of the working fluid within the jet pipe 30, thereby controlling the degree of thrust augmentation. Many reheat systems therefore control reheat system thrust augmentation by controlling the position or orientation of a component of a fuel metering valve 32, such as a metering orifice, to control the fuel flow rate provided to the reheat system 50. The demanded position or orientation of the component of the fuel metering valve 32 may be determined by a fuel flow controller.

Controlling the thrust augmentation of a reheat system 50 by controlling the position or orientation of a component of a fuel metering valve 32 has several disadvantages.

For example, tolerancing differences between different fuel metering valves 32 made to the same design mean that different metering valves 32 may deliver different fuel flow rates for the same demanded fuel flow rate (defined by the demanded position or orientation of a component of a fuel metering valve 32).

Furthermore, the fuel flow rate delivered by a specific fuel metering valve 32 may change with use of that fuel metering valve 32, due to wear or general degradation of the components within the fuel metering valve 32.

For example, the fuel flow rate delivered by the fuel metering valve 32 may decrease with use, due to degradation of seals within the fuel metering valve 32. This degradation may increase internal leakages within the fuel metering valve, leading to a reduction in the delivered fuel flow for a given position or orientation of a component of the fuel metering valve 32 relative to the delivered fuel flow when the metering valve was assembled or (if appropriate), last overhauled.

To ensure that, across of fleet of aircraft fitted with gas turbine engines and reheat systems, each engine and reheat system combination delivers the required thrust when both new and deteriorated, the relationship between demanded thrust and fuel metering valve 32 setting may be set to accommodate for the variability between fuel metering valves 32, and deterioration of these fuel metering valves 32 due to use.

This means that a portion of the fleet of reheat systems, fitted with higher flowing fuel metering valves, will deliver more fuel than demanded (overfuelling).

Overfuelling has several potential disadvantages.

For example, overfuelling may lead to a reduction in the operational range of an aircraft comprising the reheat system, as more fuel is supplied to the reheat system than required, increasing fuel consumption. This may also have a detrimental commercial impact for the manufacturer of the reheat system, as increased fuel consumption due to overfuelling may trigger penalty clauses in a commercial contract between the manufacturer and their customers, due to failure to meet a contractual operational range requirement, due to this increased fuel consumption.

Overfuelling may also further elevate temperatures within the combustion chamber 30, leading to a reduction in life of the combustion chamber or its components.

Incorrect fuelling may also lead to other control issues, as is now explained with reference to FIG. 3. This FIG. provides an example illustration of how the % augmented thrust produced by a heat system may vary with reheat system fuel air ratio (thrust to fuel:air ratio relationship 60)

Figure 3:
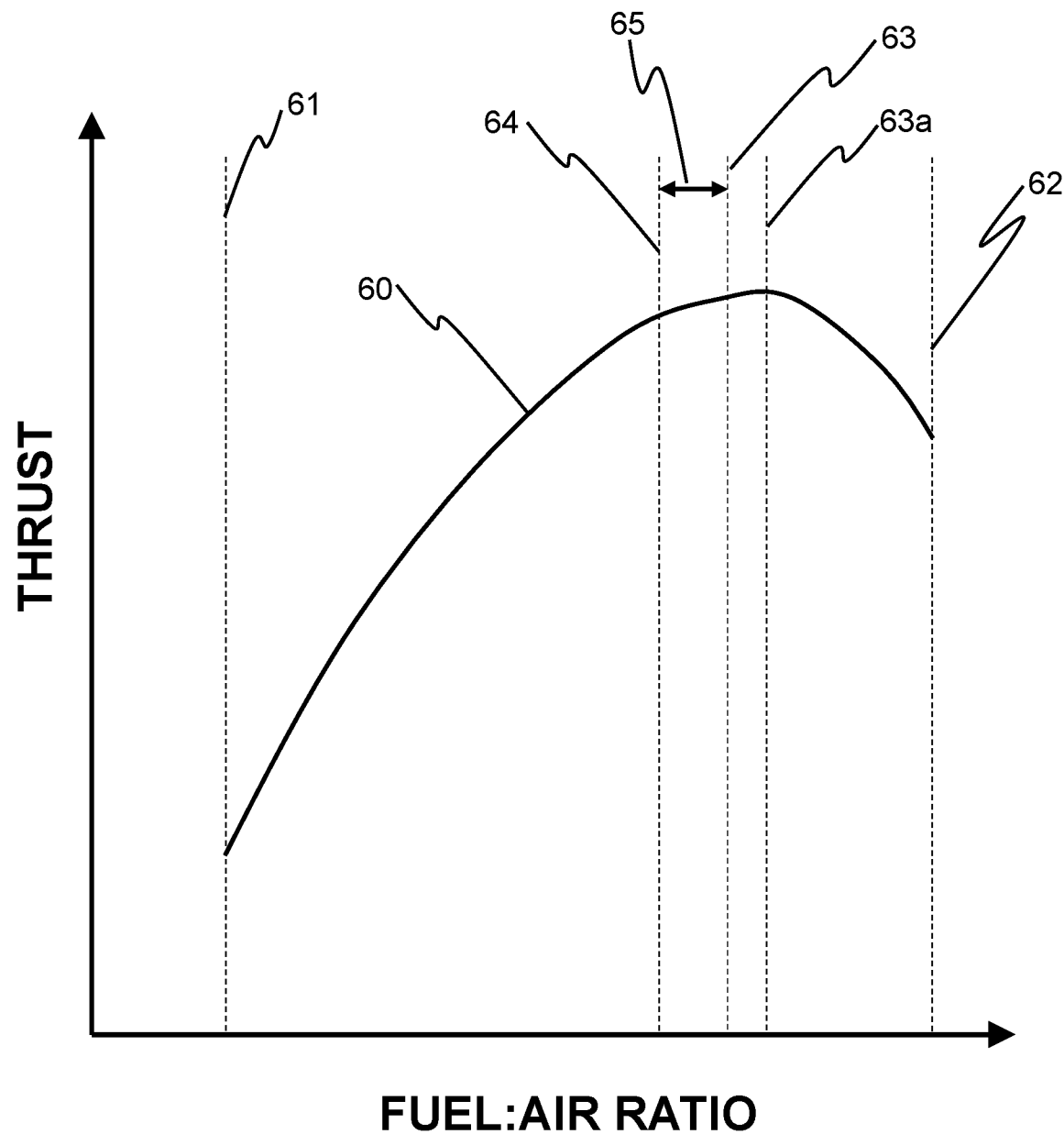
FIG. 3 is a schematic relationship between % augmented thrust produced by a reheat system, and a fuel:air ratio within the reheat duct of a reheat system.

FIG. 3 illustrates that a reheat system produces thrust over a range of fuel:air ratios, the range of fuel:air ratios having a lean extinction limit 61 and a rich extinction limit 62.

The lean extinction limit 61, at which the minimum % augmented thrust increase occurs, may correlate to a lean combustion stability limit, below which stable operation of the reheat system is not possible due to a propensity for flame out, due to excess air and correspondingly low combustion temperatures.

The rich extinction limit 62 corresponds to higher combustion temperatures than the lean extinction limit, but does not correspond to the maximum % thrust augmentation produced by the reheat system.

This is because as the fuel:air ratio approaches the rich extinction limit 62, thrust reaches a maximum 63a, before falling as fuel air ratio increases. This reduction in thrust with increasing fuel flow occurs as the fuel air ratio approaches the stoichiometric ratio, corresponding to the amount of air necessary to completely combust the fuel, but leaving no oxygen remaining post combustion.

In practical reheat systems, it is desirable to avoid operation at or close to the rich extinction limit 62, yet for operational reasons (operating at high % augmented thrust in combat), it is desirable to be capable of operation at or close to the maximum 63a. This is because if the reheat system is operated at a fuel air ratio richer than the maximum 63a, additional fuel is injected into the combustion chamber for no additional increase in thrust. This worsens the operational range of an aircraft comprising the reheat system yet provides no additional benefit in aircraft performance.

Practical reheat systems may therefore operate to an upper permissible operational limit 63, representing an afterburner fuel:air ratio that is sufficiently high to provide a high % thrust augmentation, but is close to the maximum 63a.

Although in FIG. 3, the upper permissible operational limit 63 is shown to be at a lower (leaner) fuel:air ratio than the fuel:air ratio at which maximum thrust occurs 63a, in some embodiments, the upper permissible operational limit 63 and maximum 63a may be the same.

From the previous discussion, it will be appreciated that variability between individual fuel metering valves 32, and degradation of these fuel metering valves 32 with use, causes some metering valves to overfuel, particularly when new.

Consequently, if these higher-flow fuel metering valves 32 are demanded to deliver a fuel flow corresponding to the reheat system fuel air ratio upper permissible operational limit 63, these fuel metering valves would in fact overfuel, and deliver a fuel flow equivalent to a reheat system fuel air-ratio that is greater than the upper operational limit 63. As illustrated in FIG. 3, this could lead to a decrease in thrust, despite the increase in fuelling, if the actual fuel:air ratio exceeded the fuel:air ratio at which maximum 63*a* occurs.

To ensure no individual reheat system fuel metering valve provides a maximum demanded fuel flow at a flight condition that exceeds the upper permissible operational limit 63 fuel:air ratio, it may be necessary to define an upper nominal fuel:air ratio 64, defining the maximum nominal demanded fuel flow at any given flight condition. In fuel:air ratio terms, the upper nominal fuel:air ratio is smaller than the upper permissible operation limit 63, by an offset 65. The magnitude of the offset 65 incorporates an allowance made for variability between different fuel metering valves 32 and degradation of individual metering valves 32 with time or use.

From FIG. 3, it will be appreciated that a downside of this approach is that the maximum % augmented thrust obtained by operation to the upper nominal fuel:air ratio 64 is reduced relative to operation at the upper permissible operational limit 63, and therefore, is lower than the maximum thrust that could be achieved at any given flight condition with perfect control (zero variability) of fuel air ratio. It will also be appreciated that the magnitude of this reduction is dependent on the magnitude of offset 65, allowing for fuel metering valve variation and degradation.

Reducing the magnitude of offset 65 is therefore desirable, as the magnitude of offset 65 may be correlated to a derate of the maximum thrust achievable by a reheat system. This is likely to be undesirable for a combat aircraft that comprises reheat system 50, as the derate in maximum thrust may also reduce the combat effectiveness of the combat aircraft.

An improved means of reheat system control is now disclosed.

The improved means of control reduces the required magnitude of offset 65. This is because the alternative means of control uses a static pressure-based control parameter that is more directly linked to the actual thrust produced by a reheat system, than the fuel metering valve based control means known in the art.

The improved means of control additionally reduces the magnitude of offset 65 because, unlike traditional control means based upon a position or orientation of a flow metering component within fuel metering valve 32 (volumetric based control), the alternative means of control is not affected by the changes in density of the fuel provided to the airbreathing jet engine. This may be an advantage as different standards of fuel, each having a different nominal specified density, may only be available for refuelling an aircraft comprising the airbreathing jet engine, at different geographical locations, from which the aircraft is operated.

The improved means of control therefore prevents the reheat system from operation at a fuel air ratio that is richer than the fuel air ratio 63*a* at which maximum % thrust augmentation is obtained.

It is known that as a working fluid passes through the jet pipe of a reheat system, as the working fluid has a non-zero viscosity, a reduction in static pressure occurs.

Combustion of fuel within the jet pipe 30 causes a further drop in static pressure along the length of the jet pipe, the magnitude of the pressure drop related to the working fluid temperature rise and velocity increase due to combustion. As the velocity increase of the working fluid is in turn related to a momentum change in working fluid, and hence the % augmented thrust, it may now be appreciated that a change in static pressure along the length of the jet pipe 30 of the reheat system 50 may be correlated to the % augmented thrust produced by the reheat system 50.

A control method based on static pressure drop along the reheat jet pipe (combustion chamber) may therefore be used to control the thrust developed by the reheat system.

Figure 4:
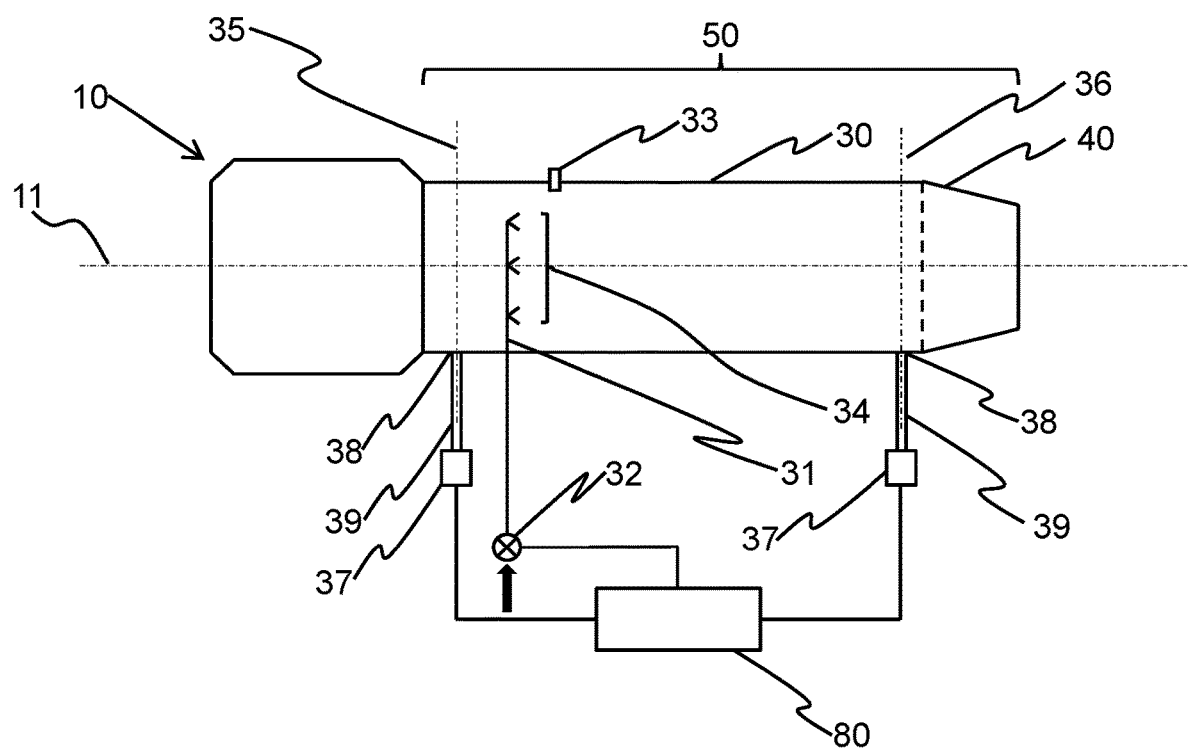
FIG. 4 is a schematic representation of a sectional side view of a reheat system, comprising jet pipe pressure measurement.

The improved means of control requires an amended form of reheat system, an example of which is illustrated in FIG. 4.

The reheat system of FIG. 4 differs from that illustrated in FIG. 2 in that it additionally comprises at least one static pressure offtake 38 at a first axial location 35 and at least one static pressure offtake 38 at a second axial location 36, different to the first axial location 35. Static pressure at the at least one static pressure offtake 38 of the first axial location 35 and second axial location 36 is obtained by pressure measurements made with at least one pressure transducer 38.

The first axial location 35 is upstream of the second axial location 36.

The first axial location 35 may be upstream of the at least one fuel injection apparatus 31. In other words, the first axial location 35 is at an axial location within the combustion chamber which is upstream of a portion of the combustion chamber in which combustion may take place.

The first axial location 35 may be at or proximal to the interface between an exit of the gas turbine engine 10 and an inlet to the reheat system 50. For example, the first axial location 35 may be at an exit plane of the bypass duct 22.

The second axial location 36 may be downstream of the at least one fuel injection apparatus 31. In other words, the second axial location 36 is at an axial location within the combustion chamber which is downstream of a portion of the combustion chamber in which combustion may take place.

The second axial location 36 may be proximal to the interface of the combustion chamber 30 and propelling nozzle 40.

In some but not necessarily all embodiments, the first axial location 35 may be a plane, such as a cross-sectional plane of the combustion chamber 30, at a constant axial location along the length of the combustion chamber. Similarly, the second axial location 36 may be plane, such as a cross-sectional plane of the combustion chamber 30, at a constant axial location along the length of the combustion chamber.

Alternatively, in other embodiments, the first axial location 35 may be an inclined plane across the width of the combustion chamber and the second axial location 36 may also be an inclined plane across the width of the combustion chamber.

Other arrangements of first axial location 35 and second axial location 36 may also be envisaged without departing from the scope of the invention.

In some but not necessarily all embodiments, a plurality of static pressure measurements may be made at the first axial location 35 and/or the second axial location 36.

For example, in embodiments in which the first axial location 35 is a cross-sectional plane through the combustion chamber 30, the at least one pressure offtake 38 at the first axial location may comprise a plurality of static pressure offtakes 38. The plurality of pressure offtakes 38 may be circumferentially disposed around a perimeter of the cross-sectional plane. In some but not necessarily all these embodiments, the plurality of pressure offtakes 38 at the first axial location may be fluidically connected to each other.

Similarly, the at least one pressure offtake 38 at the second axial location may comprise a plurality of static pressure offtakes 38. The plurality of pressure offtakes 38 may be circumferentially disposed around a perimeter of a cross-sectional plane. In some but not necessarily all these embodiments, the plurality of pressure offtakes 38 at the second axial location may be fluidically connected to each other.

Fluidically connecting a plurality of pressure offtakes 38 at the same axial location May be desirable because the static pressure formed by the fluidic connection of the plurality of offtakes is an average of the static pressures local to each static pressure offtake of the plurality of static pressure offtakes 38. This form of averaging is a fluidic average. Fluidically connecting a plurality of pressure offtakes 38 at the same axial location may also be desirable because it reduces the number of pressure transducers 39 required.

The at least one static pressure offtake 38 at the first axial location 35 is configured to enable a measurement of the static pressure at the first axial location to be obtained.

The at least one static pressure offtake at the second axial location is configured to enable a measurement of the static pressure at the second axial location to be obtained.

Each static pressure offtake 38 at the first and second axial locations 35, 36 comprises an aperture in the wall of the combustion chamber 30, the aperture being substantially flush with a wall of the combustion chamber and substantially parallel with a direction of flow of the working fluid proximal to the hole. In this way, a pressure measured by the static pressure offtake does not comprise a dynamic component, as there is no "ram" effect to the measurement.

Tubing 39 is mechanically connected at a first end to the wall of the combustion chamber 30 surrounding each aperture to form a seal with the surrounding wall of the combustion chamber 30 and is coupled at a second end to a pressure transducer 37. The tubing 39 forms a fluidic connection between static pressure offtake 38 and pressure transducer 37.

The pressure transducer 37 may be remote from the combustion chamber 30 and aperture. This may be advantageous because the temperature of the pressure transducer may be substantially lower than the temperature of the wall of the combustion chamber 30. This may be desirable because the local temperature of the wall of the combustion chamber 30 is high during operation of the reheat system 50 and may otherwise damage a transducer proximal to the wall or require that the transducer be cooled.

Locating the pressure transducer 37 remote from the combustion chamber 30 via tubing may have an additional advantage in that the tubing 39 may provide attenuation of higher frequency static pressure oscillations that may otherwise be more distinctly measured by a pressure transducer closely coupled to the at least one static pressure offtake on the wall of the combustion chamber 30.

Various ways of measuring the static pressures at the first axial location 35 and the second axial location 36 are envisaged.

For example, in some but not necessarily all examples, the static pressure at the first axial location 35 may be measured by a first pressure transducer 37, and the static pressure at the second axial location 36 may be measured by a second pressure transducer 37 (as illustrated in FIG. 4).

Also in some but not necessarily all examples, the static pressure at the first axial location 35 and the static pressure at the second axial location 36 may be measured by a common pressure transducer. The common pressure transducer is fluidically couplable to at least one static pressure offtake at the first axial location 35 and is fluidically couplable to at least one static pressure offtake at the second axial location. A switching apparatus is between the common pressure transducer and the at least one static pressure offtake at the first axial location 35 and the at least one static pressure offtake at the second axial location 36. The switching apparatus comprises a first configuration and a second configuration, switching between the first and second configurations being controlled by a controller.

In embodiments comprising a common pressure transducer, in the first configuration, the aperture at the first axial location is fluidically coupled to the common transducer, but the aperture at the second axial location is not fluidically coupled to the common pressure transducer. Similarly, in embodiments comprising a common pressure transducer, in the second configuration, the aperture at the second axial location is fluidically coupled to the common transducer, but the aperture at the first axial location is not fluidically coupled to the common pressure transducer.

Alternatively, in some but not necessarily all embodiments, a first pressure transducer 37 may be connected to one of the at least one static pressure offtake at the first axial location 35 and the at least one static pressure offtake at the second axial location 36. In these embodiments, a differential pressure transducer may be fluidically connected to the at least one static pressure offtake at the first axial location 35 at a first input to the differential pressure transducer and to at least one static pressure offtake at the second axial location 36 at a second input to the differential pressure transducer. In these embodiments, the differential pressure transducer measures a static pressure difference between the first axial location 35 and the second axial location 36. In this arrangement, the static pressure at one of the first axial location 35 and the second axial location 36 is obtained directly by measurement, while the static pressure at the other of the first axial location 35 and the second axial location 36 may be obtained by addition or subtraction of the measured pressure difference between the first axial location 35 and the second axial location 36, as appropriate. Fluidically connecting a differential pressure transducer between the at least one aperture at the first axial location 35 and the at least one aperture at the second axial location 36 may result in improved accuracy of the determined upstream and downstream static pressures, as for example, it may permit a pressure transducer with a smaller full-scale pressure range to be used, than would otherwise be possible.

In alternative embodiments, static pressure is not measured remotely, but an individual pressure transducer is mounted in each static pressure offtake 38 such that a measurement surface of the static pressure transducer is flush mounted with the wall of the combustion chamber 30. As previously disclosed, in these embodiments, cooling to the pressure transducer 37 may be additionally provided.

Measuring static pressure directly has the advantage that measurement lag is reduced relative to remote static pressure measurement. This may be advantageous when the fuel flow demanded is changing rapidly, as transient overshooting of delivered fuel flow beyond the thrust maximum 63a, towards the rich extinction limit 62 may be minimised or prevented.

In embodiments in which a plurality of static pressure offtake measurements are made, it will be appreciated that averaging of related static pressure offtakes 38 (for example, those at a common location) may alternatively be made numerically, rather than by fluidically coupling the offtakes 38 together.

Pressure fluctuations may be present within the combustion chamber 30. The pressure fluctuations may be generated by combustion and/or modulation of the fuel metering valve 32. In some, but not necessarily all embodiments, frequency-based filtering (for example, smoothing) may be applied to the output of pressure transducer 37.

In embodiments in which filtering is applied to the output signals provided by the static pressure transducer, the filtering may be provided by a low-pass filter, a high-pass filter or a combination of both. The filtering may be provided to remove oscillations from the output signals caused by pressure oscillations present within the combustion chamber 30. This may improve the stability of the control method.

The filtering provided may be dependent upon the acoustic properties of the combustion chamber 30 and the properties of the working fluid within the combustion chamber. For example, the filtering may be provided to attenuate at least one frequency generated by combustion of the working fluid and fuel within the combustion chamber 30.

The at least one frequency may be generated based at least in part on an axial length of the combustion chamber, a characteristic cross-sectional dimension of the combustion chamber, such as a diameter of the combustion chamber, and/or a ratio of the length to the characteristic diameter.

The at least one frequency may be based upon a temperature, such as an average temperature of the working fluid within the combustion chamber.

The at least one frequency may be based upon a residence time of the working fluid within the combustion chamber.

The at least one frequency may be based upon a blade-passing frequency of the high-pressure turbine 17, intermediate pressure turbine 18 and/or a low-pressure turbine 19.

The at least one frequency may be based upon a frequency of fluctuation in the pressure of fuel provided to fuel injection apparatus 31, as may be generated by a fuel pump providing fuel to the fuel injection apparatus 31.

From the above disclosure, it will be appreciated that the thrust augmentation produced by a reheat system may therefore be controlled by varying the fuel supplied by the fuel metering valve 32 such that a measured static pressure between the first axial location 35 and the second axial location 36 is substantially equal to a demanded static pressure drop between the first axial location 35 and the second axial location 36, wherein the demanded pressure drop correlates to the desired thrust augmentation.

It may also be appreciated though that the above method of control relates to changes in static pressure, and changes in thrust.

As an aircraft equipped with a reheat system is operated over a range of flight conditions (altitude, forward speed), it may also be appreciated that the static pressure at any given location within the combustion chamber 30 of the reheat system 50 may be strongly influenced by the aircraft flight condition.

For example, the static pressure at any given location within the combustion chamber 30 may be substantially higher when the aircraft is flown at high speed and low altitude, relative to when the aircraft is flown at a low speed and high altitude. This means that the pressure drop along the combustion chamber 30 of the reheat system 50 may also be strongly influenced by aircraft flight condition. Similarly, the maximum thrust developed by the engine 10 will be higher at low altitude to that achievable at higher altitude, as is known in the art.

It is therefore desirable for a static pressure based reheat system thrust control method to take account of aircraft flight condition. The desired thrust augmentation around the aircraft flight envelope may be determined by the customer of the aircraft and may be a function of aircraft altitude and aircraft speed (for example, Mach number).

The desired thrust augmentation at a flight condition correlates to the demanded pressure drop between the first axial location 35 and the second axial location 36.

Therefore, by obtaining a demanded power setting (the desired thrust augmentation) from either an aircraft control system or input from a pilot of the aircraft, and by accounting for the aircraft altitude and aircraft speed, the demanded pressure drop between the first axial location 35 and the second axial location 36 may be obtained.

It may be appreciated that a variety of alternative approaches may be used to convert the input conditions (demanded thrust augmentation, aircraft altitude and aircraft speed) into the output condition (demanded pressure drop between the first axial location 35 and the second axial location 36).

Figure 5:
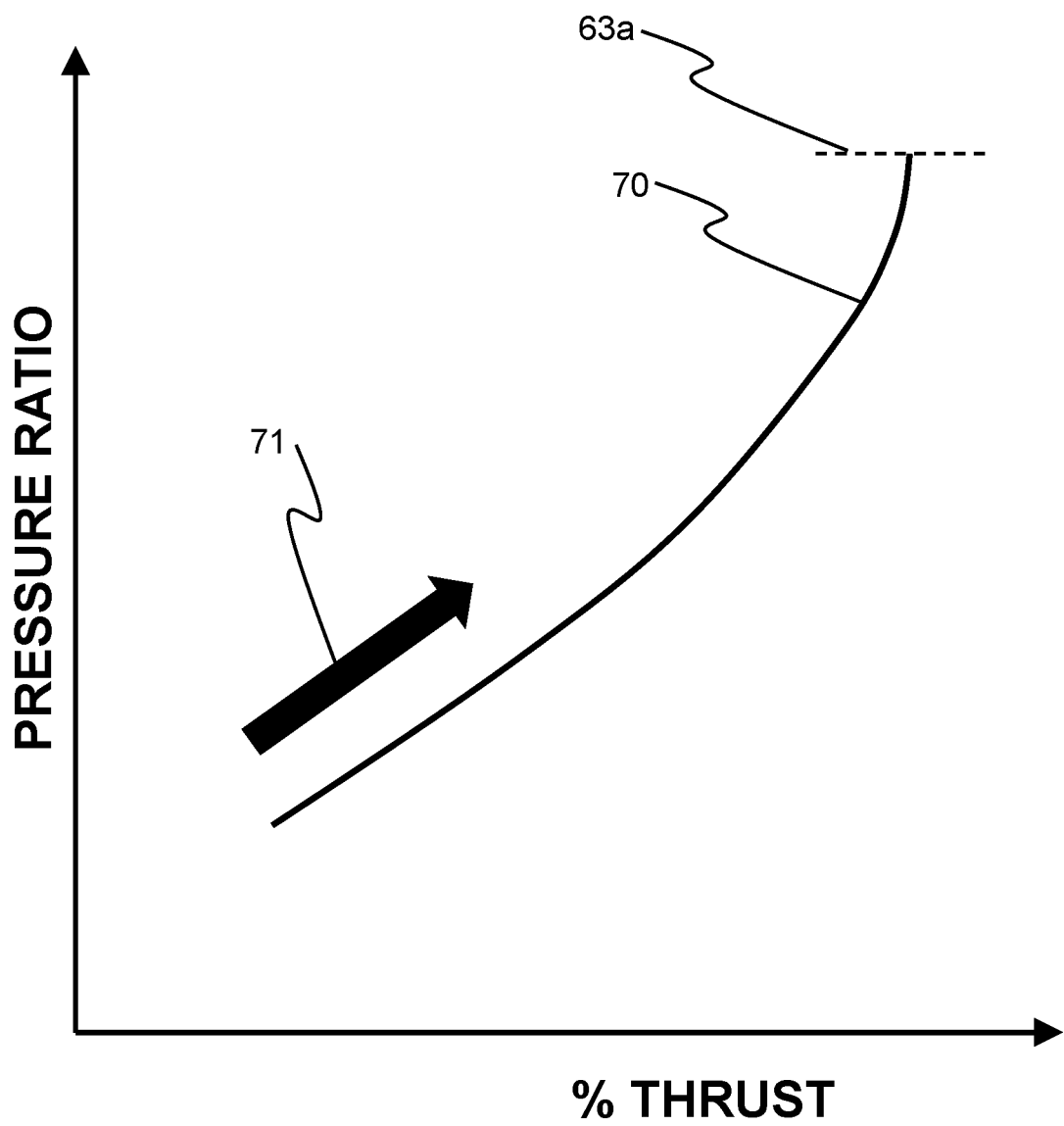
FIG. 5 is a schematic relationship between the pressure ratio at two axial locations within the duct of a reheat system and the % augmented thrust obtained; and, FIG. 6 is an example method of thrust control for a reheat system.

By way of example, one approach is illustrated in FIG. 5 which provides an example of a % augmented thrust: pressure ratio relationship 70, in which:

% Thrust is defined as a % increase in thrust generated by the reheat system relative to a datum. The datum may for example, correspond to a maximum thrust that may be provided by the gas turbine engine 10 at a current aircraft flight condition; and Pressure ratio is defined as the static pressure at the first axial location 35, divided by the static pressure at the second axial location 36.

Relationship 70 may be used for thrust control, as is subsequently disclosed.

Relationship 70 may be derived by numerical analysis or test, or a combination of both.

The ratio of static pressure at the first axial location 35 to static pressure at the second axial location 36 may be in the range of 1.1 to 1.55.

FIG. 5 additionally comprises an arrow representing a direction of increasing fuel:air ratio 71. The corresponding range of fuel:air ratios of relationship 70 ranges from a low fuel air:ratio (at or close to the lean stability limit of the combustion chamber), to the fuel air ratio corresponding to the maximum of the thrust:fuel air ratio relationship illustrated in FIG. 3.

In the example relationship 70 illustrated in FIG. 5, the relationship does not comprise data for fuel air ratios richer than the maximum 63*a* illustrated in FIG. 3, as there is no operational benefit in operating the reheat system at fuel air ratios richer than the maximum.

Figure 6:
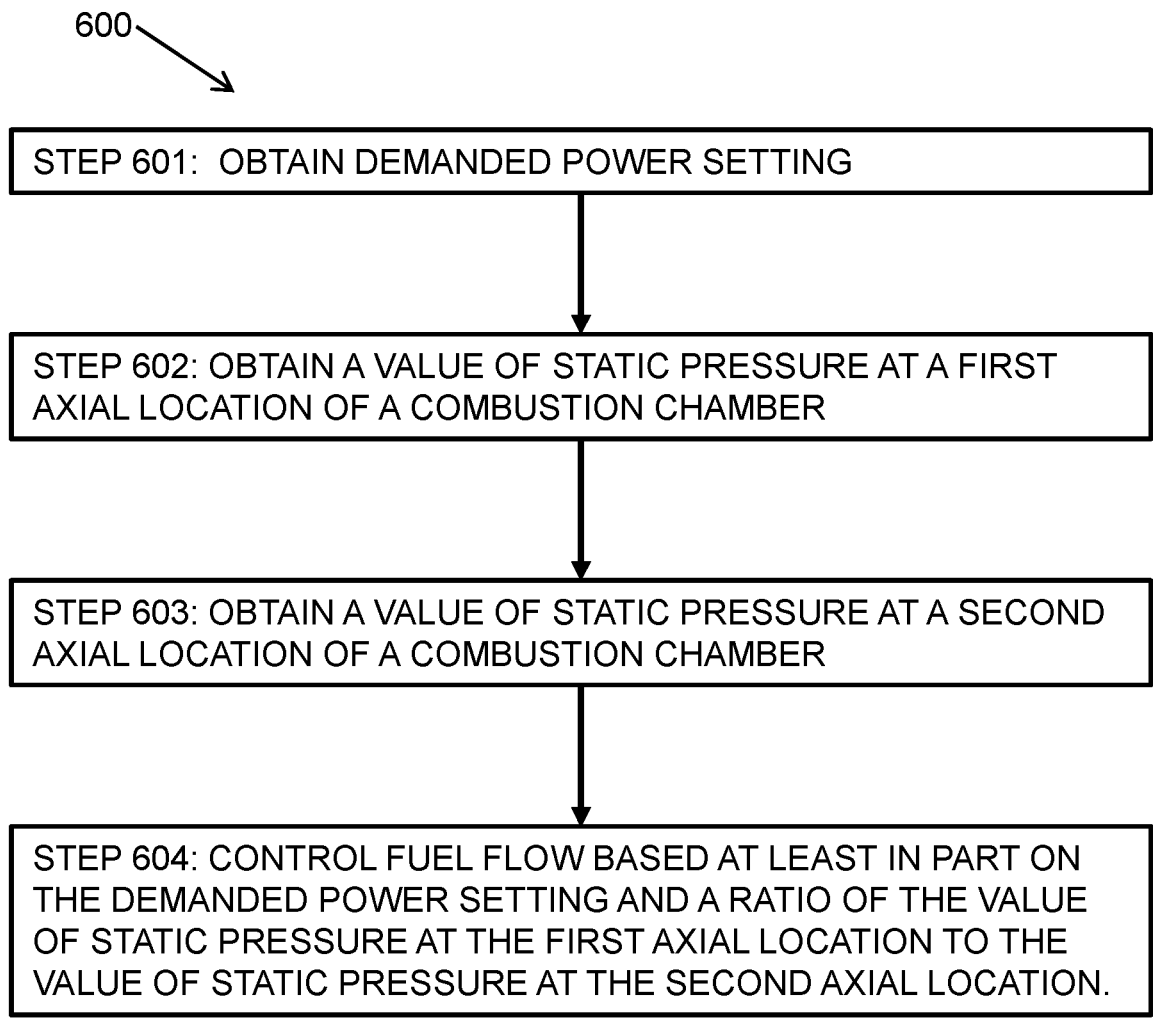

The use of the above relationship for thrust control is now disclosed, in relation to the method of FIG. 6.

At step 601, a demanded thrust (power setting) is obtained. The demanded power setting may be derived from an output from a throttle, actuatable by a pilot of an aircraft or by a controller of an aircraft. In some but not necessarily all embodiments, a common throttle may be used to control both the demanded thrust of the gas turbine engine 10, and the demanded augmented thrust of the reheat system. In these embodiments, at lower power settings, only the gas turbine engine 10 develops thrust, with the reheat system inactive. At higher power settings, the reheat system is additionally activated (for example, by providing fuel to the at least one fuel injection apparatus & energising ignitor 33).

At step 602, a value of static pressure at a first axial location 35 within the combustion chamber 30 is obtained, by measurement of the static pressure at the least one static pressure offtake 38 at the first axial location 35.

At 603, a value of static pressure at a second axial location 36 within the combustion chamber 30 is obtained, by measurement of the static pressure at the least one static pressure offtake 38 at the second axial location 36.

The value of static pressure at the first axial location 35 and the second axial location 36 may be an average measured static pressure at the respective first and/or second axial location.

The value of the static pressure at the first axial location 35 may be obtained by fluidic averaging, achieved by fluidically connecting static pressure offtakes at the first axial location 35. The value of the static pressure at the first axial location 35 may alternatively be obtained by numerical averaging of a plurality of static pressure measurements made independently at a plurality of static pressure offtakes 38 at the first axial location 35. At least one of frequency-based filtering and/or smoothing may be applied to the output signal produced by a pressure transducer, to obtain the value of the static pressure at the first axial location 35.

The value of the static pressure at the second axial location 36 may be obtained by fluidic averaging, achieved by fluidically connecting static pressure offtakes at the second axial location 36. The value of the static pressure at the second axial location 36 may be obtained by obtained by numerical averaging of a plurality of static pressure measurements made independently at a plurality of static pressure offtakes 38 at the second axial location 36. At least one of frequency-based filtering and/or smoothing may be applied to the output signal produced by a pressure transducer, to obtain the value of the static pressure at the second axial location 36.

At step 604, a ratio of the value of static pressure at the first axial location 35 to the value of static pressure at the second axial location 36 is obtained. This corresponds to a non-dimensionalised thrust developed by combustion within the combustion chamber. This ratio of static pressure values is then compared to a demanded pressure ratio value. The demanded pressure ratio value is obtained from a known pressure ratio to thrust relationship 70, by inputting the demanded thrust, obtained at step 601, into the relationship 70.

Relationship 70 may be in the form of a look-up table or an equation.

Closed loop control is then used to vary the actual, measurement-derived static pressure ratio to be substantially equal to the demanded pressure ratio. From FIGS. 3 and 5 and the above disclosure, it is evident that the actual, measurement-derived static pressure ratio may be varied by varying the fuel flow rate delivered to the fuel injection apparatus 31 by the fuel metering valve 32—i.e., closed loop pressure ratio based control is achieved by changing a demand in a position or orientation of a component, such as a metering orifice, within the fuel metering valve 32, such that the actual static pressure ratio, obtained from pressure measurements at the first and second axial locations, is substantially equal to the demanded static pressure ratio, obtained from the pressure ratio to thrust relationship 70.

Optionally, several derivatives to step 604 are also envisaged.

For example, although the pressure ratio to thrust relationship 70 illustrated in FIG. 5 is non-dimensional, and may thus compensate for variations in flight condition (altitude, speed) of an aircraft utilising the above control method, it may be appreciated that at certain flight conditions, it may be desirable to apply a modifier, such as a multiplier to the non-dimensional pressure ratio to thrust relationship 70 to determine demanded pressure ratio at a specific flight condition. This is because the actual capability of the reheat-system and/or gas turbine engine may be limited at specific flight conditions, due to another limit, such as a rotational speed of a shaft of the gas turbine engine 10, being reached. The multiplier may be determined from a look-up table or multi-dimensional equation, having parameters related to the aircraft flight condition as input, and the multiplier as output.

Parameters relating to the aircraft flight condition may comprise aircraft altitude, aircraft velocity, ambient atmospheric static pressure and/or ambient static temperature.

The demanded pressure ratio may also be further modified based upon a configuration of the airbreathing jet engine. For example, the demanded pressure ratio may also be further modified based upon a demanded cross-sectional area of variable area propelling nozzle 40 (if present) or a demanded jet discharge angle from a thrust-vectoring propelling nozzle 40 (if present).

It may be appreciated that changes in the discharge angle of a jet relating to principal axis 11 due to actuation of the thrust-vectoring nozzle 40 may change the static pressure distribution within the jet-pipe at a constant thrust.

As the fuel flow controller is configured to control fuel flow rate based on a pressure ratio within the combustion chamber 30, varying the discharge angle of the jet, may therefore undesirably change the thrust developed by the reheat system, for no change in demanded power setting, as the fuel flow controller compensates for the change in static pressure distribution caused by actuation of the thrust-vectoring nozzle.

Step 604 may therefore additionally comprise the determination and application of an additional modifier to the demanded pressure ratio, the additional multiplier compensating for the demanded discharge angle of the jet caused by thrust vectoring. The additional multiplier may be determined from a look-up table, array or multi-dimensional equation, having the demanded thrust vectoring nozzle angle as an input and the additional multiplier as output.

Similarly, it may also be appreciated that changing the cross-sectional area of a variable area propelling nozzle 40 at a demanded thrust may also change the magnitude of static pressures within different portions of the combustion chamber at a constant thrust. In some embodiments, the demanded pressure ratio may therefore be further amended based upon the configuration (demanded cross-sectional area) of the variable area propelling nozzle.

The above thrust control method of steps 601 to 604 may additionally be used to control fuel distribution within the reheat system by controlling at least one fuel distribution valve. As previously disclosed, in some embodiments, the airbreathing jet engine 50 may comprise at least one fuel distribution valve, the at least one fuel distribution valve distributing fuel to different portions of the at least one fuel injection apparatus 31. The different portions of the at least one fuel injection apparatus 31 may injection fuel at different locations within the combustion chamber 30.

A notable difference between the combustion chamber 30 of a reheat system 50 (jet pipe) and the combustion equipment 16 of a gas turbine engine 10, is that although the combustion equipment 16 of the gas turbine engine 10 is configured to combust all or substantially all of the fuel injected into it before expansion of the resulting combustion products in downstream turbines 17, 18, 19, the combustion efficiency of the combustion chamber 30 of the reheat system 50 may be substantially less than 100%. This means that uncombusted fuel, in the form of vapour may be present in the propelling jet as it leaves propelling nozzle 40.

It is desirable to increase the combustion efficiency of the reheat system, as this may have an operational benefit of increasing the operational range of an aircraft equipped with the reheat system 50.

The combustion efficiency of the reheat system 50 may be altered by altering the distribution of fuel injected by different portions of the at least one fuel injection apparatus 31, by actuating the at least one fuel distribution valve.

In a derivative of the above method, a configuration of the at least one fuel distribution valve is changed in response to the ratio of the value of static pressure obtained at the first axial location 35 to the value of static pressure at the second axial location 36.

The configuration of the at least one fuel distribution valve may for example, be configured by the fuel flow controller to be changed such that the ratio of the value of static pressure at the first axial location 35 to the value of static pressure at the second axial location 36 is a maximum for a fixed position or orientation of a fuel-metering component of the at least one fuel metering valve 32. This is because the maximum corresponds to a peak combustion efficiency for variations in the fuel distribution valve setting at the demanded thrust setting, and consequently, a minimum in fuel consumption at this thrust setting.

Alternatively, in embodiments in which the reheat system 50 comprise a plurality of independent fuel injection apparatus, in which each fuel injection apparatus provides fuel to a different portion of the combustion chamber 30, fuel may be distributed to different portions of the combustion chamber 30 by independently controlling the fuel provided by each independent fuel injection apparatus.

In these embodiments, the proportion of fuel provided to each independent fuel injection apparatus may be varied such that the ratio of the value of static pressure at the first axial location 35 to the value of static pressure at the second axial location 36 is a maximum for a fixed total fuel flow delivered, the total fuel flow delivered being the sum of the fuel delivered by each independent fuel injection apparatus.

In some but not necessarily all embodiments, the above method of control may be used as a sole method of thrust control for the airbreathing jet engine.

In other embodiments, the above method of control may be used as one of several methods of control (control loops), running simultaneously within a fuel flow controller of the airbreathing jet engine.

For example, the above method of control may run in parallel with a conventional fuel metering valve position demand based control system. In these embodiments, selection of which method of control to use may be based upon a comparison of the fuel metering valve position demanded. For example, the selected control loop may be determined based on a "minimum wins" criterion, in which the control loop, of a plurality of control loops running simultaneously, which outputs the lowest demanded fuel metering valve position is selected. In these embodiments, the above control loop functions as a fuel flow rate limiter, thereby preventing overfuelling at demanded % thrust augmentations.

Other uses of the static pressure offtake measurements are also envisaged.

For example, a drop in static pressure at the second axial location relative to the first axial location, for no substantial change in aircraft flight condition (altitude, speed) following provision of fuel by the at least one fuel Injection apparatus 31, and energising an ignitor 33, may indicate that ignition of fuel has occurred in the combustion chamber.

Similarly, a rise in static pressure at the second axial location relative to the first axial location, for no substantial change in aircraft flight condition may indicate that a flameout event has occurred in the combustion chamber.

Thus, by comparing the static pressure measured at the second axial location to the static pressure measured at the first axial location, it is possible to determine the current state of the combustion chamber (lit, unlit, ignition, flameout).

Although the above method of thrust control has been disclosed in relation to a reheat-system 50, it will be appreciated that the method is also applicable to other forms of airbreathing jet engine in which a measured pressure drop or pressure ratio between two axial locations may be correlated to a thrust develop by the air breathing engine. For example, the method may also be applied for thrust control of a ramjet, or other forms of athodyd.

It will be understood that the invention is not limited to the examples above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method of thrust control for an airbreathing jet engine that has a combustion chamber, the method comprising:
   obtaining a demanded thrust setting;
   obtaining a value of static pressure at a first axial location of the combustion chamber of the airbreathing jet engine;
   obtaining a value of static pressure at a second axial location of the combustion chamber of the airbreathing jet engine, wherein the second axial location is downstream of the first axial location;
   obtaining a ratio of the value of static pressure at the first axial location of the combustion chamber to the value of static pressure at the second axial location of the combustion chamber; and
   controlling a fuel flow rate of the airbreathing engine based at least in part on the demanded thrust setting and the ratio of the value of the static pressure at the first axial location to the value of the static pressure at the second axial location.

2. The method of claim 1, wherein the first axial location is upstream of a fuel injection apparatus within the combustion chamber, and the second axial location is downstream of the fuel injection apparatus of the combustion chamber.

3. The method of claim 1, wherein the value of static pressure at the first axial location is obtained by measuring a static pressure at at least one static pressure offtake in a wall of the combustion chamber at the first axial location; and the value of static pressure at the second axial location is obtained by measuring a static pressure at at least one static pressure offtake in a wall of the combustion chamber at the second axial location.

4. The method of claim 3, wherein the value of static pressure at the first axial location is an average of the static pressure measured at the at least one static pressure offtake at the first axial location; and the value of static pressure at the second axial location is an average of the static pressure measured at the at least one static pressure offtake at the second axial location.

5. The method of claim 4, wherein the average of static pressure measured at the first axial location is a fluidic average and the average of static pressure measured at the second axial location is a fluidic average.

6. The method of claim 4, wherein the average of static pressure measured at the first axial location is a numerical average; and the average of static pressure measured at the second axial location is a numerical average.

7. The method of claim 1, wherein controlling fuel flow rate based at least in part on the demanded thrust setting and a ratio of the value of the static pressure at the first axial location to the value of the static pressure at the second axial location comprises:
referencing a look-up table or equation having the demanded thrust setting as an input to determine a demanded ratio of the value of the static pressure at the first axial location to the value of the static pressure at the second axial location from an output of the look-up table; and
varying a fuel flow rate to the airbreathing jet engine such that the ratio of the value of the static pressure at the first axial location of the combustion chamber to the value of static pressure at the second axial location of the combustion chamber is substantially equal to the demanded ratio of the value of the static pressure at the first axial location to the value of the static pressure at the second axial location.

8. The method of claim 7, wherein the demanded ratio of the value of the static pressure at the first axial location to the value of the static pressure at the second axial location is additionally based upon a flight condition of an aircraft comprising the airbreathing jet engine.

9. The method of claim 8, wherein the flight condition of the airbreathing engine comprises at least one of a velocity of the airbreathing jet engine, a static temperature of an atmosphere through which the airbreathing jet engine is travelling, a static pressure of the atmosphere through which the airbreathing jet engine is travelling.

10. The method of claim 7, wherein the demanded ratio of the value of the static pressure at the first axial location to the value of the static pressure at the second axial location is additionally based upon a demanded discharge angle of a jet through a thrust-vectoring propelling nozzle.

11. The method of claim 7, wherein the demanded ratio of the value of the static pressure at the first axial location to the value of the static pressure at the second axial location is additionally based upon a demanded cross-sectional area of a variable area propelling nozzle.

12. The method of claim 11, wherein the demanded ratio of the value of the static pressure at the first axial location to the value of the static pressure at the second axial location is additionally based upon a demanded discharge angle of a jet through a thrust-vectoring propelling nozzle.

13. The method of claim 1, wherein controlling the fuel flow rate of the airbreathing jet engine additionally comprises varying a configuration of at least one fuel distribution valve to vary the distribution of fuel to different portions of the fuel injection apparatus such that the fuel flow rate provided to the airbreathing jet engine is minimised for the demanded thrust setting.

14. An airbreathing jet engine comprising:
a combustion chamber;
at least one fuel injection apparatus configured to inject fuel into the combustion chamber;
at least one static pressure offtake at a first axial location within the combustion chamber;
at least one static pressure offtake at a second axial location within the combustion chamber;
at least one pressure transducer, the at least one pressure transducer configured to obtain a value of static pressure at the first axial location, and to obtain a value of static pressure at the second axial location;
a fuel metering valve; and
a fuel flow controller;
wherein the fuel flow controller controls a flow rate of fuel provided by the fuel metering valve to the combustion chamber via the at least one fuel injection apparatus based at least in part on a demanded thrust setting for the airbreathing jet engine and a ratio of a value of the static pressure at the first axial location to a value of the static pressure at the second axial location.

15. The airbreathing jet engine of claim 14, wherein the fuel flow controller controls the flow rate of fuel additionally based upon a flight condition of an aircraft comprising the airbreathing jet engine.

16. The airbreathing jet engine of claim 14, wherein the fuel flow controller controls the flow rate of fuel additionally based upon a configuration of the airbreathing jet engine.

17. The airbreathing jet engine of claim 16, wherein the fuel flow controller controls the flow rate of fuel additionally based upon a flight condition of an aircraft comprising the airbreathing jet engine.

18. The airbreathing jet engine of claim 14, wherein the airbreathing jet engine is an afterburner.

19. The airbreathing jet engine of claim 14, wherein the airbreathing jet engine is a ramjet.

* * * * *